Oct. 14, 1947.  W. H. T. HOLDEN  2,428,800
TELEMETRIC SUMMATION SYSTEM
Filed June 30, 1944  2 Sheets-Sheet 1
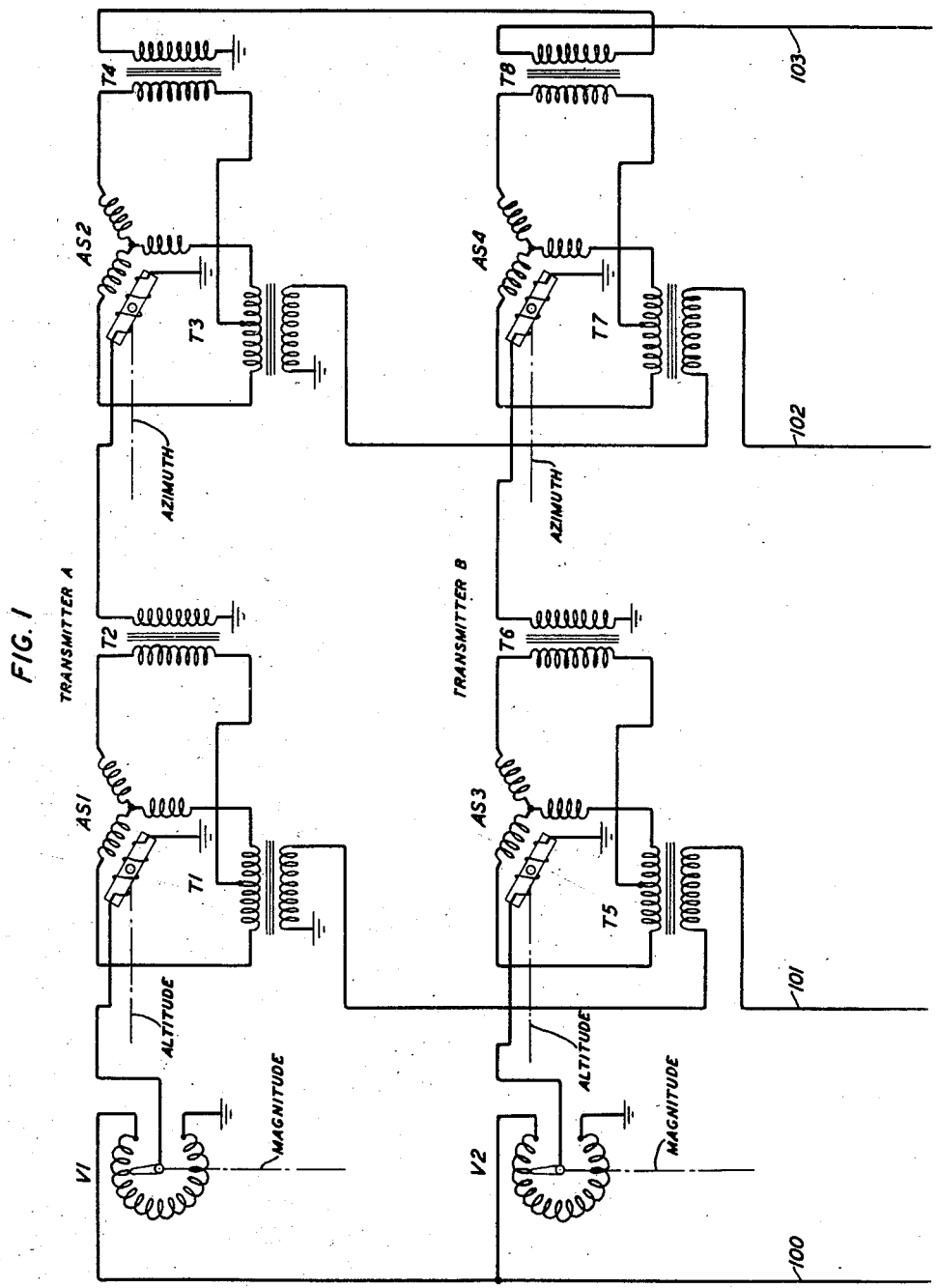
INVENTOR
W. H. T. HOLDEN
BY P. C. Smith
ATTORNEY Oct. 14, 1947.   W. H. T. HOLDEN   2,428,800
TELEMETRIC SUMMATION SYSTEM
Filed June 30, 1944   2 Sheets-Sheet 2
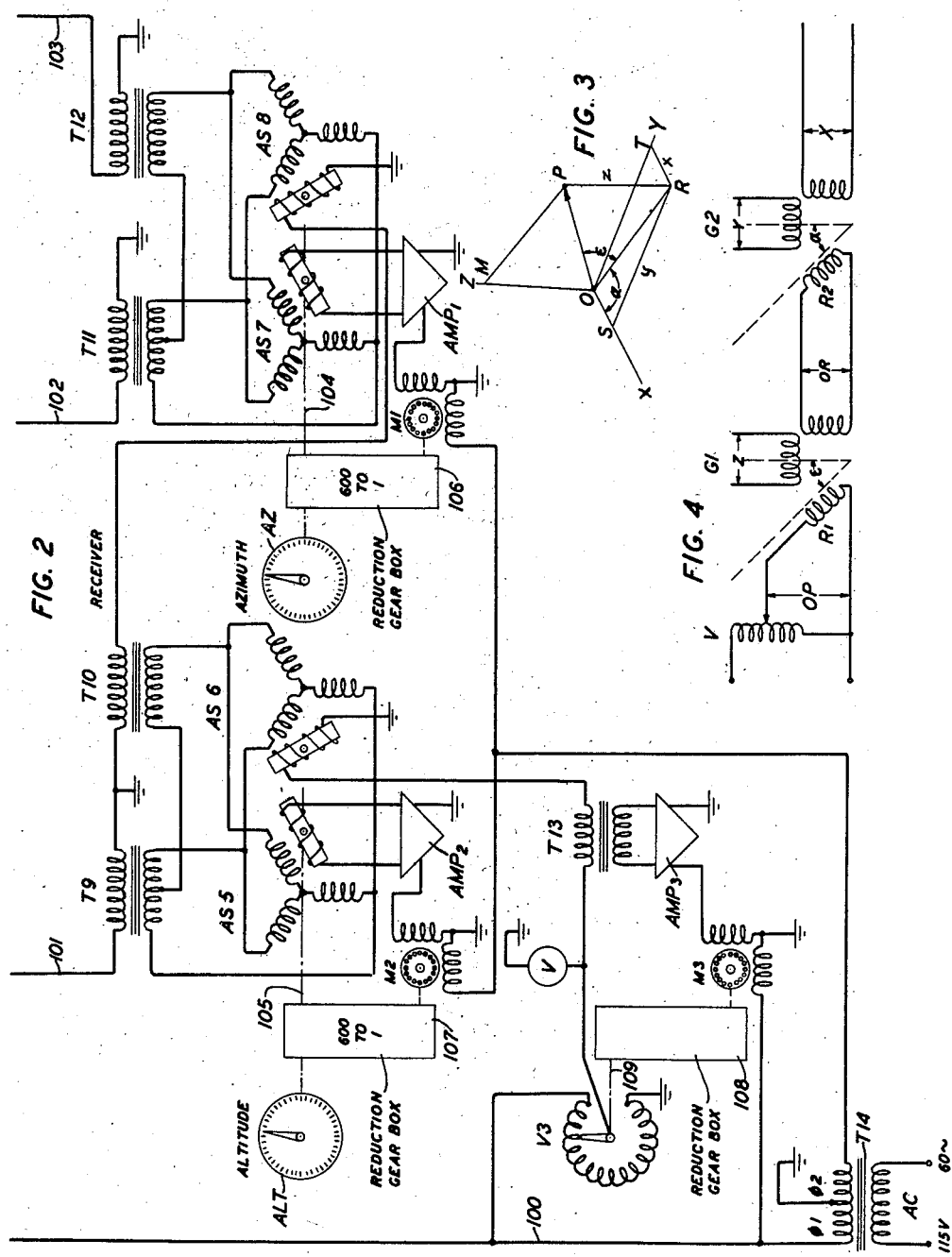
INVENTOR
W. H. T. HOLDEN
BY
P. C. Smith
ATTORNEY Patented Oct. 14, 1947

2,428,800

UNITED STATES PATENT OFFICE 2,428,800

TELEMETRIC SUMMATION SYSTEM

William H. T. Holden, Woodside, N. Y., assignor to Bell Telephone Laboratories, Incorporated, New York, N. Y., a corporation of New York Application June 30, 1944, Serial No. 542,968

5 Claims. (Cl. 235—61.5)

This invention relates to a telemetric summation system and has for its object the provision of a new and simple arrangement of apparatus, whereby the three-dimensional components of a plurality of vectors may be added and from such additions the angles and amplitude of the resultant may be determined.

In accordance with the present invention, this object is attained by the employment of generators having three Y-connected stator windings and control transformers having three Y-connected stator windings. A pair of generators is provided for each vector to be added. The single phase rotor of the first of such generators is energized by alternating current having a potential which is varied in proportion to the magnitude of a vector and such rotor is turned through an angle proportional to the altitude angle of the vector. The potentials generated by the stator windings of the first generator are converted by a so-called Scott-connected transformer into potentials in space quadrature relationship, one output potential being proportional to the $z$ coordinate of the vector and the second output potential being proportional to the horizontal diagonal component of the vector. The second output potential is applied as an energizing potential to the single phase rotor of the second generator which rotor is turned through an angle proportional to the azimuth angle of the vector. The potentials generated by the stator windings of the second generator are converted by another Scott-connected transformer into potentials in space quadrature relationship, one output potential being proportional to the $x$ coordinate of the vector and the other output potential being proportional to the $y$ coordinate of the vector. Thus by the two generators and the associated transformers the polar coordinates of the vector are changed into the Cartesian coordinates of such vector.

The first phase secondary windings of the Scott-connected transformers associated with the first generators of all of the pairs are connected in series and the corresponding secondary windings of the Scott-connected transformers associated with the second generators of all pairs are connected in series whereby the output potentials are added. Such potentials are then applied to the primary windings of two Scott-connected receiving transformers.

The secondary windings of one of these receiving transformers are connected to the three-phase stator windings of two control transformers, the stator windings of which are connected in parallel. The rotor winding of one of these control transformers is connected to the input winding of an amplifier circuit which amplifies the potential induced into such stator winding and applies it to one phase winding of a two-phase servo motor, the other phase winding of which is energized by the alternating current supply. This servo motor is geared by reduction gearing to the rotor shaft of the control transformers and when the servo motor operates, it rotates the rotor shaft of the control transformers until the rotor of one transformer assumes an angular position corresponding to the sum of the angular positions of the rotors of the transmitting generators which were set in accordance with the altitude angles of the vectors at which time the servo motor comes to rest. The rotor shaft controls an indicator which indicates the altitude angle. At that time the rotor winding of the other control transformer, being mounted on the shaft in quadrature to the rotor of the associated control transformer, is so positioned as to receive maximum energization from its stator windings so that the potential induced therein is proportional to the sum of the potentials impressed upon the rotors of the transmitting generators which determine the magnitudes of the vectors. This potential is applied to control a two-phase servo motor which operates a balancing coil until it applies a potential opposite in phase and value to the rotor current whereupon the servo motor stops and a voltmeter indicates the value of the balancing potential and thereby the sum of the potentials received by the receiving motor indicative of the sum of the magnitudes of the vectors.

The secondary windings of the other Scott-connected receiving transformer are connected to the three phase stator windings of two other control transformers, the stator windings of which are connected in parallel. The rotor winding of one of those control transformers is connected to the input winding of an amplifier circuit which amplifies the potential induced into such rotor winding and applies it to one phase winding of a two-phase servo motor, the other phase winding of which is energized by the alternating current supply. This servo motor is geared by reduction gearing to the rotor shaft of the receiving motors and when the servo motor operates, rotates the rotor shaft of the two control transformers until the rotor assumes an angular position corresponding to the sum of the angular positions of the rotors of the transmitter generators which were set in accordance with the azimuth angles of the vectors, at which time the servo motor comes to rest. The rotor shaft controls an indicator which indicates the azimuth angle. At that time the rotor winding of the other control transformer, being mounted on the rotor shaft in quadrature to the rotor of the associated control transformer, is so positioned as to receive maximum energization from its stator windings so that the potential induced therein is proportional to the sum of the potentials impressed upon the rotors of the transmitting generators which determine the magnitudes of the diagonal components of the horizontal coordinates of the vectors. This potential is supplied to one of the primary windings of the other receiving Scott-connected transformer.

The invention having now been briefly described, reference may be made to the following detailed description thereof taken in connection with the accompanying drawings in which:

Fig. 1 shows transmitter circuits and apparatus for adding the polar coordinate values of a plurality of vectors and for transmitting such values as proportional potentials to receiving circuits and apparatus;

Fig. 2 shows receiving circuits and apparatus for receiving potentials proportional to the sums of the polar coordinate values of a plurality of vectors and for operating indicating instruments to indicate the values of the summation vectors;

Fig. 3 is a diagram showing the geometrical resolution of a vector from its polar into its cartesian coordinates; and Fig. 4 is a simplified circuit diagram illustrative of the electrical conversion of potentials proportional to the polar coordinates of a vector into potentials proportional to the Cartesian coordinates of the vector.

For each vector to be added a transmitter comprising two alternating current generators and two output transformers of the Scott-connected type are provided. Each of the generators AS1, AS2, AS3 and AS4 comprises a single phase rotor winding and three Y-connected stator windings. The stator windings might, however, be Δ-connected. The stator windings of each generator are connected to the primary windings of a Scott-connected transformer. The rotor winding of one of the generators of each transmitter is supplied with potential which may be varied in accordance with the magnitude of a vector and is rotatable through an angle equal to the altitude angle of the vector and the rotor winding of the other generator of each transmitter is supplied with potential from one of the secondary windings of the Scott-connected transformer associated with the other generator of the same transmitter and is rotatable through an angle equal to the azimuth angle of the vector.

The receiver comprises four control transformers AS5, AS6, AS7 and AS8 each having three Y-connected stator windings and a single phase rotor winding. The control transformers are grouped in pairs, the stator windings of each pair being connected in parallel and energized from the secondary windings of an associated Scott-connected receiving transformer and the rotor windings being mounted on the same shaft but disposed in quadrature with respect to each other. Since control transformers of this type do not follow the transmitter-generators linked therewith, servo motors of the two-phase type are geared to the shafts of the control transformers to move the rotors of the control transformers into positions of angular correspondence to the sum of the positions assumed by the transmitting generators.

Referring now to Fig. 3, a vector OP is represented with respect to the OX, OY and OZ axes. The line PR drawn from the point P of the vector perpendicular to the plane of the OX and OY axes is the $z$ coordinate of the vector, the line RS drawn from point R perpendicular to the OY axis is the $y$ coordinate of the vector and the line RT drawn from the point R perpendicular to the OX axis is the $x$ coordinate of the vector. These lines RT, RS and PR become the $x$, $y$ and $z$ coordinates of the vector OP. If now the line OR be drawn in the plane of the axes OY and OX, it becomes the projection of the horizontal trace of the vector OP and the angle between OR and the axis OY becomes the azimuth angle $\alpha$ of the vector and the angle between the vector OP and the line OR becomes the elevation angle $\epsilon$ of the vector. The magnitude and the location of the vector OP may thus be determined by the length of the line OP and the angles $\alpha$ and $\epsilon$ or the polar coordinates of the vector.

Vectors may be represented by potentials which have values proportional to the coordinate values of the vectors. To enable vectors to be added when they are so represented it is only necessary to add the potentials of the corresponding coordinates. While for some purposes, such as the direction of artillery fire, etc., it is more convenient to represent vectors by their polar coordinates, it is more convenient in adding vectors to add the Cartesian coordinates of such vectors and therefore if vectors are represented by potentials proportional to their polar coordinates, it becomes desirable to convert such potentials into potentials which represent the same vectors in terms of their Cartesian coordinates. Fig. 4 illustrates diagrammatically an electrical circuit by which such a conversion may be made in a very simple manner.

It will be assumed that the vector OP of Fig. 3 may be determined by a potential OP derived from the autotransformer V and that this potential is impressed upon the rotor R1 of the transmitter G1. This rotor may be rotatable in any desired manner with respect to the stator windings of the transmitter G1 until its axis makes an angle with the vertical axis of the transmitter G1 equal to the angle $\epsilon$ in Fig. 3. Then the potential across the horizontal stator winding will be, $$OP \sin \epsilon$$

and the potential across the vertical stator winding will be $$OP \cos \epsilon$$

However, referring to Fig. 3, $$OP \sin \epsilon = z$$

and therefore a potential is induced into the horizontal stator winding proportional to the vertical coordinate $z$ of the vector potential OP. Also $$OP \cos \epsilon = OR$$

With the vertical stator winding of generator G1 connected to the rotor winding R2 of the generator G2, a potential proportional to OR is impressed on the rotor winding R2. If now the rotor winding R2 is rotated in any suitable manner with respect to the stator windings of the generator G2, until its axis makes an angle with the vertical axis of the generator G2 equal to the angle $\alpha$ in Fig. 3, then the potential across the horizontal stator winding will be $$OR \sin \alpha$$

and the potential across the vertical stator winding will be $$OR \cos \alpha$$

However, referring to Fig. 3, $$OR \sin \alpha = y$$
$$OR \cos \alpha = x$$

and therefore a potential is induced into the horizontal stator winding proportional to the horizontal coordinate $y$ of the vector potential OP and a potential is induced across the vertical stator winding proportional to the horizontal coordinate $x$ of the vector potential OP. In this very simple manner the potentials representing the polar coordinates of the vector OP, that is, the magnitude potential OP and the azimuth and elevation angle potentials $\alpha$ and $\epsilon$ are converted into the Cartesian coordinate potentials $x$, $y$ and $z$.

In Fig. 1 this same conversion has been illustrated in connection with generators having three Y-connected stator windings connected to the primary windings of Scott-connected transformers. Scott-connected transformers for converting three-phase current into two-phase current are well known in the art as disclosed for example in Patent 521,051, granted June 5, 1894, to C. F. Scott. Comparing Figs. 1 and 4, the secondary winding of the horizontally disposed transformer T1 and the secondary winding of the vertically disposed transformer T2 of Fig. 1 correspond respectively to the horizontal and vertical stator windings of the generator G1 of Fig. 4 and the secondary winding of the horizontally disposed transformer T3 and the secondary winding of the vertically disposed transformer T4 of Fig. 4 correspond respectively to the horizontal and vertical stator windings of the generator G2 of Fig. 4 and potentials proportional to the $z$, $y$ and $x$ coordinates of the input potential proportional to the first vector applied to the stator winding of the generator AS1, are impressed upon the secondary windings of transformers T1, T3 and T4, respectively.

As illustrative of the manner in which the invention may be employed, it will be assumed that the transmitter A of Fig. 1 is adjusted in accordance with the polar coordinates of a first vector which might, for example, be the vector of a target with respect to a gun position and that transmitter B is adjusted in accordance with the polar coordinates of a second vector which might, for example, be a correction which should be added to determine a correct pointing of the gun on a target. The variable autotransformer V1 is accordingly adjusted in accordance with the magnitude of the first vector and derives a potential from the potential applied across the winding and over conductor 100 from the left secondary winding of the power transformer T14 which is proportional to the magnitude of the first vector. This potential through the action of the autotransformer V1 is applied across the rotor winding of the generator AS1. It will be assumed that this rotor is moved manually or otherwise in accordance with the altitude angle of the first vector and that the rotor winding of the generator AS2 is moved manually or otherwise in accordance with the azimuth angle of the first vector.

The potential impressed upon the rotor of generator AS1 causes a variation of the potentials induced into the stator windings of such generator in response to the rotary adjustment of the rotor to the required altitude angle which varying potentials are converted into a two-phase changing output at the secondary windings of the Scott-connected transformers T1 and T2. The output potential from the secondary winding of transformer T1 is impressed upon conductor 101 and varies proportionally to the change in the value of the $z$ Cartesian coordinate of the first vector potential. The output potential of the secondary winding of transformer T2 is applied across the rotor winding of the generator AS2 and as that rotor is turned into a position indicative of the azimuth angle of the first vector, a variation of the potentials induced into the stator windings of the generator AS2 is caused which, through the connection of the three windings of the stator to the primary windings of the Scott-connected transformers T3 and T4, is converted into a two-phase changing output at the secondary windings of the transformers T3 and T4. The output potential from the secondary winding of transformer T3 is impressed upon conductor 102 and varies proportionally to the change in the value of the $y$ coordinate of the first vector potential and the output potential from the secondary winding of transformer T4 is impressed upon the conductor 103 and varies proportionally to the change in the value of the $x$ coordinate of the first vector.

Similarly potential applied from the source AC over the windings of power transformer T14 and conductor 100 is applied through the action of the variable autotransformer V2, which is adjusted in accordance with the magnitude of the second sector, across the rotor winding of the generator AS3. It is assumed that the rotors of generators AS3 and AS4 are adjusted in accordance with the altitude and azimuth angles of the second vector and accordingly during their adjustment the potential applied to the rotor of generator AS3 creates a variation of the potentials induced into the three stator windings of such generator which through the associated Scott-connected transformers T5 and T6 converts these varying potentials into a two phase changing output at the secondary windings of these transformers. The output potential from the secondary winding of transformer T5 is impressed upon conductor 101 and varies proportionally to the change in the value of the $z$ coordinate of the second vector potential. The output potential from the secondary winding of transformer T6 is applied across the rotor winding of the generator AS4 and as that rotor is turned into a position indicative of the azimuth angle of the second sector causes a variation of the potentials induced into the stator windings of generator AS4 which, through the connection of the three-phase windings of the stator to the primary windings of the associated Scott-connected transformers T7 and T8, is converted into a two-phase changing output at the secondary windings of transformers T7 and T8. The output potential from the secondary winding of transformer T7 is impressed upon conductor 102 and varies proportionally to the change in the value of the $y$ coordinate of the second vector potential and the output potential from the secondary winding of transformer T8 is impressed upon conductor 103 and varies proportionally to the change in the value of the $x$ coordinate of the second vector.

Since the secondary windings of transformers T1 and T5, T3 and T7, and T4 and T8 are connected in series with respect to conductors 101, 102 and 103, the output potentials from the serially connected windings are added and applied across the primary windings of the transformers T9, T11 and T12, respectively, of the receiver of Fig. 2. The secondary windings of the transformers T9 and T10 are Scott-connected to the three stator windings of two control transformers AS5 and AS6, the similar windings of which are connected in parallel and the secondary windings of the transformers T11 and T12 are Scott-connected to the three stator windings of two control transformers AS7 and AS8, the similar windings of which are connected in parallel. With the single phase rotor winding of the motor AS8 connected in series with the primary winding of the transformer T10, the pairs of transformers T9 and T10 and T11 and T12 serve to convert the potentials applied to conductors 101, 102 and 103 and which vary in accordance with $z$, $y$ and $x$ coordinates of the sums of the vector potentials, into a variation of the potentials in the stator windings of the pair of transformers AS5 and AS6 commensurate with the sum of the variations of the potentials in the stator windings of the transmitter generators AS1 and AS3 and into a variation of the potentials in the stator windings of the pair of transformers AS7 and AS8 commensurate with the sum of the variations of the potentials in the stator windings of the transmitting generators AS2 and AS4.

The rotors of the pair of control transformers AS5 and AS6 are mounted on a common shaft 105 but one rotor is disposed in quadrature with respect to the other. Similarly the rotors of the pair of control transformers AS7 and AS8 are mounted on a common shaft 104 but one rotor is disposed in quadrature with respect to the other.

The rotor winding of the control transformer AS7 is connected to the input side of an amplifying circuit AMP1 which might for example be of the type fully disclosed in my copending application Serial No. 621,691, filed October 11, 1945, or of the type disclosed in Patent No. 1,654,075, granted December 27, 1927, to W. S. Gorton. The output side of this amplifier circuit is connected across one phase winding of the stator of a servo motor M1 of the inductor type, the other phase winding of which is connected to the right secondary winding of power transformer T14. The rotor of motor M1 is connected through the gear box 106 preferably having a gear reduction ratio of 600 to 1 to the shaft 104 whereby motor M1 is enabled to turn the shaft 104 at a slow speed. In response to the energization of the stator windings of control transformer AS7, potential is impressed upon the rotor winding which is amplified by the amplifier AMP1 and impressed upon the control phase winding of motor M1. Motor M1 thereupon operates in turn rotating the shaft 104 until the rotor winding of control transformer AS7 is turned to the position with respect to the stator windings in which no potential is impressed therein from the stator windings. When it reaches this position no potential is impressed upon the control phase winding of motor M1 and the motor stops thereby arresting the rotation of the shaft 104. The angular position now assumed by the rotor of control transformer AS7 corresponds to the addition of the angular positions of the rotors of the transmitting generators AS2 and AS4 and may be indicated by an azimuth indicating instrument AZ driven by the shaft 104.

The rotor of control transformer AS8 being disposed on the shaft 104 in quadrature to the rotor of control transformer AS7, when the rotor of transformer AS7 has been positioned so as to reduce the potential induced therein to zero, the rotor of transformer AS8 will be positioned to receive the maximum potential induced therein from its stator windings and this potential is applied to the primary winding of transformer T10 to enable transformers T9 and T10 to supply the potentials to the control transformers AS5 and AS6 requisite to their operation for causing an indication of the summation of the magnitudes and altitude angles of the vectors.

The rotor winding of the transformer AS5 is connected to the input side of the amplifying circuit AMP2, similar to the amplifying circuit AMP1, the output side of which is connected across one phase winding of the stator of a servo motor M2, the other phase winding of this motor being connected to the right secondary winding of power transformer T14. The motor M2 is connected through the gear box 107, preferably having a gear reduction ratio of 600 to 1, to the shaft 105 whereby the motor M2 is enabled to drive the shaft 105 at a slow speed. In response to the energization of the stator windings of this control transformer AS5, potential is impressed upon the rotor winding which is amplified in the amplifier circuit AMP2 and impressed upon the control phase winding of motor M2. Motor M2 thereupon operates in turn rotating the shaft 105 until the rotor winding of transformer AS5 is turned to the position with respect to the stator windings in which no potential is impressed therein from the stator windings. When it reaches this position, no potential is impressed upon the control phase winding of the servo motor M2 and the motor stops thereby arresting the rotation of the shaft 105. The angular position now assumed by the rotor of the transformer AS5 corresponds to the addition of the angular positions of the rotors of the transmitter generators AS1 and AS3 and may be indicated by an altitude indicating instrument ALT driven by the shaft 105.

The rotor of transformer AS6, being disposed on the shaft 105 in quadrature to the rotor of transformer AS5, when the rotor of transformer AS5 has been positioned so as to reduce the potential induced therein to zero, the rotor of transformer AS6 will be positioned to receive the maximum potential induced therein from its stator windings.

This potential is applied through the primary winding of transformer T13 to the brush of balancing autotransformer V3 the winding of which is energized from the source AC over the windings of power transformer T14. The potential thus applied to the primary winding of transformer T13 is applied from the secondary winding of such transformer to the input side of amplifier circuit AMP3 which is of the same type as the amplifier circuits AMP1 and AMP2, is amplified thereby and applied to the control phase winding of the two-phase servo motor M3. The other phase winding of this motor is supplied from the left secondary winding of the power transformer T14. The rotor of motor M3 is connected through the reduction gear box 108 to the shaft of the balancing autotransformer V3 whereby the operation of the motor is effective to slowly adjust the brush of the autotransformer V3. So long as potential is induced into the secondary winding of transformer T13, the motor M3 will operate to adjust the autotransformer until such autotransformer has been set so that the potential supplied therethrough and the potential from the rotor winding of control transformer AS6 become balanced at which time no current will be induced into the secondary winding of transformer T13 and the motor M3 will cease operating. The voltmeter V, calibrated in terms of the measure of magnitude will give an indication of the sums of the magnitudes of the vectors.

While the invention has been illustrated as applied to the summation of two vectors, it is to be understood that by the addition of other transmitters similar to the transmitters A and B any desired number of vectors could be added. Also while the application of the invention and the summation of data for artillery pointing has been mentioned by way of illustration, it will be obvious that the invention is applicable to many situations where it is desired to add a plurality of vectors having three dimensional components.

While the circuits shown employ three-phase secondary control transformers, it is obvious that two-phase secondaries would permit the Scott-connected transformers to be omitted. Owing to the fact that most control transformers are provided with three-phase windings it is necessary to use the additional Scott-connected transformers to secure resolution into rectangular or cartesian coordinates. However, a simplification of the circuits would result from the use of two-phase windings as shown in my Patent No. 2,382,994, issued August 21, 1945.

What is claimed is:

1. In a telemetric system, a plurality of transmitters each comprising a first and a second transmitting device, each device having a single winding rotor and a multiwinding stator, means for connecting the stator windings of each device into a two-phase termination, one of the phases of the termination of the first device being serially looped with the rotor of the second device, a receiver comprising a first and a second receiving device each having a single winding rotor and a multiwinding stator, means for connecting the stator windings of each receiving device into a two-phase termination, one of the phases of the termination of the first receiving device being serially looped with the rotor of the second receiving device, conductors connecting the other phases of the terminations of the first devices of said transmitters and receivers in series and for connecting the corresponding phases of the terminations of the second devices of said transmitters and receivers in series, means for applying potentials to the rotors of the first devices of said transmitters proportional to the magnitudes of different vectors, means for rotationally displacing the rotors of the devices of each of said transmitters proportionally to the altitude and azimuth angles of said respective vectors, and means controlled by the rotational displacement of the rotors of the receiving devices for indicating the altitude and azimuth angles and the magnitude of the resultant of said vectors.

2. In a telemetric system, a plurality of transmitters each comprising a first and a second generator, each generator having a single winding rotor and a three-winding stator, a Scott-connected transformer associated with each of said generators for connecting the three windings thereof into a two-phase output, means for applying potential from one of said two phases to the rotor of the second generator, a receiver comprising a first and a second receiving device each having a single winding rotor and a three-winding stator, a Scott-connected transformer associated with each of said receiving devices for converting a two-phase input into a three-potential output and for applying the three-potential output to the stator windings of the associated device, means for connecting one of the primary windings of the transformer associated with the first receiving device with the rotor winding of the second receiving device, a conductor serially connecting the other output phases of the transformers associated with the first generators of the transmitters with the other primary winding of the transformer associated with the first receiving device, conductors serially connecting the output phases of the transformers associated with the second generators of said transmitters with the primary windings of the transformer associated with the second receiving device, means for applying potentials to the rotors of the first generators of said transmitters proportional to the magnitudes of different vectors, means for rotationally displacing the rotors of the generators of each of said transmitters proportionally to the altitude and azimuth angles of said respective vectors, and means controlled by the rotational displacement of the rotors of the receiving devices for indicating the altitude and azimuth angles and the magnitude of the resultant of said vectors.

3. In a telemetric system for summing a plurality of three-dimensional vectors, transmitters operable respectively in accordance with the values of the polar coordinates of said vectors, each of said transmitters comprising a first and a second generator each having a single winding rotor and a three-winding stator, means for applying a potential to the rotor of the first generator of each transmitter proportional to one of the vectors, means for rotationally displacing the rotors of the generators of each transmitter proportionally to the altitude and azimuth angles of one of the vectors, means for converting the polar coordinates of said vectors into the corresponding cartesian coordinates comprising Scott-connected transformers associated with the generators of each transmitter the primary windings of which are connected to the stator windings of the generators, one secondary winding of the transformer associated with the first generator of the transmitter being connected to the rotor winding of the second generator of the transmitter, and conductors interconnecting the remaining corresponding secondary windings of the transformers of all of said transmitters, said conductors having potentials thereon proportional to the summation of the Cartesian coordinates of the vectors.

4. In a telemetric system, a plurality of transmitters each comprising a first and a second generator, each generator having a single winding rotor and a three-winding stator, a Scott-connected transformer associated with each of said generators the primary windings of which are connected with the stator windings of the generators and one secondary winding of the transformer associated with the first generator of each transmitter being connected to the rotor winding of the second generator of the same transmitter, conductors serially interconnecting the remaining corresponding secondary windings of the transformers associated with all of said transmitters, a receiver comprising a first and a second receiving device each having a single winding rotor and a three-winding stator, a Scott-connected transformer associated with each of said receiving devices the secondary windings of which are connected with the stator windings of the receiving devices, one of the primary windings of the transformer associated with the first receiving device being connected to the rotor winding of the second receiving device and the remaining primary windings being connected to said conductors, means for applying potentials to the rotors of the first generators of said transmitters proportional to the magnitudes of different vectors, means for rotationally displacing the rotors of the generators of each of said transmitters proportionally to the altitude and azimuth angles of said respective vectors, and means controlled by the rotational displacement of the rotors of the receiving devices in response thereto for indicating the altitude and azimuth angles and the magnitude of the resultant of said vectors.

5. In a telemetric system, a plurality of transmitters each comprising a first and a second generator, each generator having a single winding rotor and a three-winding stator, means for applying potentials to the rotors of the first generators of said transmitters proportional to the magnitudes of different vectors, means for rotationally displacing the rotors of the generators of each of said transmitters proportionally to the altitude and azimuth angles of said respective vectors, means associated with each transmitter for converting the potentials generated thereby in accordance with the polar coordinates of the vector into the $x$, $y$ and $z$ Cartesian coordinates of the vectors, conductors interlinking the converting means associated with each transmitter, and a receiver in which said conductors terminate comprising a first pair of control transformers, a second pair of control transformers, each of said control transformers having a three-winding stator and a single winding rotor, a motor geared to the rotors of said first pair of transformers, a thermionic amplifier circuit interposed between the rotor of one transformer of said first pair and said motor for controlling said motor to bring the rotor of said one transformer into a rotational position corresponding to the vectorial sum of the positions of the rotors of the first generators of said transmitters and to bring the rotor of said other transformer of the first pair into a rotational position in which the potential impressed thereupon is proportional to the vectorial sum of the potentials applied to the rotors of the first generators of said transmitters, a motor geared to the rotors of said second pair of transformers, a thermionic amplifier circuit interposed between the rotor of one transformer of said second pair and said latter motor for controlling said motor to bring the rotor of said one transformer into a rotational position corresponding to the vectorial sum of the positions of the rotors of the second generators of said transmitters, and means controlled by said control transformers for indicating the magnitude and altitude and azimuth angles of the resultant vector.

WILLIAM H. T. HOLDEN.

REFERENCES CITED

The following references are of record in the file of this patent:

UNITED STATES PATENTS

| Number | Name | Date |
|---|---|---|
| 1,871,710 | Lenehan | Aug. 16, 1932 |
| 2,080,186 | Reymond | May 11, 1937 |
| 2,134,901 | Wey | Nov. 1, 1938 |